United States Patent [19]

Powell et al.

[11] Patent Number: 4,904,047
[45] Date of Patent: Feb. 27, 1990

[54] OPTICAL FIBRE CABLES

[75] Inventors: Robert J. W. Powell, Wembley; Brian A. Irving, Northwood, both of England

[73] Assignee: Telephone Cables Limited, United Kingdom

[21] Appl. No.: 323,286

[22] Filed: Mar. 14, 1989

[30] Foreign Application Priority Data

Mar. 18, 1988 [GB] United Kingdom ............... 8806543
Dec. 2, 1988 [GB] United Kingdom ............... 8828220

[51] Int. Cl.$^4$ ................................................. G02B 6/44
[52] U.S. Cl. .................................... 350/96.23; 502/159
[58] Field of Search ......................... 350/96.23, 96.34; 502/159, 161, 169, 401

[56] References Cited

U.S. PATENT DOCUMENTS

| 4,688,889 | 8/1987 | Pasini et al. | 350/96.23 |
|---|---|---|---|
| 4,715,678 | 12/1987 | Johnson et al. | 350/96.23 |
| 4,717,236 | 1/1988 | Dewing | 350/96.34 X |
| 4,718,747 | 1/1988 | Bianchi et al. | 350/96.29 X |
| 4,725,122 | 2/1988 | Anelli et al. | 350/96.23 |
| 4,741,592 | 5/1988 | Secco et al. | 350/96.23 |

FOREIGN PATENT DOCUMENTS 0200914 12/1986 European Pat. Off. .
2167424 5/1986 United Kingdom .

Primary Examiner—William L. Sikes
Assistant Examiner—Akm E. Ullah
Attorney, Agent, or Firm—Kirschstein, Ottinger, Israel & Schiffmiller

[57] ABSTRACT

An optical fibre cable includes, within a surrounding cover, at least one optical fibre extending longitudinally, and a hydrogen-absorptive material comprising a metal cation and an organic anion, preferably dispersed or dissolved in a water-blocking compound. The hydrogen-absorptive material may be a metal salt, preferably a silver salt, of a carboxylic acid, or else a metal loaded ion exchange resin.

14 Claims, No Drawings

OPTICAL FIBRE CABLES

BACKGROUND OF THE INVENTION

This invention relates to optical fibre cables. A common problem with optical fibre cables is that, with time, the optical transmission properties of the fibres tend to deteriorate. This is due mainly to the absorption by the fibres of hydrogen evolved within the cable.

SUMMARY OF THE INVENTION

It is an object of this invention to reduce the effect of this hydrogen on the fibres.

Acording to the invention, an optical fibre cable includes, within a surrounding cover, at least one optical fibre extending longitudinally, and a hydrogen-absorptive material in which the active part consists solely of a metallic cation and an organic anion. The active, i.e. hydrogen-absorptive, part may comprise a compound formed from the metallic cation and the organic anion. Preferably, the cable further includes a water-blocking compound in which the hydrogen-absorptive material is dissolved or dispersed.

The use of an organic anion, in comparison with the previous use of inorganic anions such as zeolites, has an increased hydrogen absorptivity and a greater compatibility with petroleum jelly and other conventional water-blocking compounds.

The hydrogen-absorptive material is preferably a metal salt of a carboxylic acid. The term "carboxylic acid" is intended to include more complex molecules containing one or more carboxylic acid groups, such as di-carboxylic and poly-carboxylic acids, as well as the simple acid. Certain metal salts such as silver slats are simple to prepare and are strongly absorptive of hydrogen; alternative metal salts are those of copper, iron, nickel and cobalt.

An alternative hydrogen-absorptive material is an ion exchange resin on which a metal is absorbed; again, the preferred metal is silver but alternatives are copper, iron, nickel and cobalt.

The metal salts and the metal loaded ion exchange resin both react over extended periods with hydrogen present in the cable, so that there is less hydrogen to affect the optical fibres. Moreover, the nature of the preferred silver compounds is such that they do not damage optical fibres with which they may be in contact.

DETAILED DESCRIPTION OF THE PREFERRED EMBODIMENTS

Example 1

A mixture of 100 parts petroleum jelly and 0.1 part silver loaded cationic ion exchange resin was found experimentally to absorb 0.06 ml/g of pure hydrogen after 300 hours at 40° C.

Example 2

After the same period of time at 40° C., a mixture of 100 parts petroleum jelly and 0.1 part silver hexanoate absorbed 0.07 ml/g of pure hydrogen.

Example 3

After the same period of time at 40° C., a mixture of 100 parts petroleum jelly and 0.2 part of cupric 2 - ethyl - hexanoate absorbed 0.025 ml/g of pure hydrogen.

Example 4

A mixture of 100 parts hydrocarbon oil and 0.1 part of silver polyacrylate was found experimentally to absorb 0.06 ml/g of pure hydrogen after 1200 hours at 40° C.

Example 5

A similar performance to the material of Example 4 was found experimentally for silver methacrylate in place of silver polyacrylate.

Similar performances to the materials of Examples 4 and 5 are expected for silver acrylate and silver polymethacrylate.

Experiments have also been carried out with materials in which another cation, such as ammonium, is present as well as silver. The capacity for hydrogen in this instance was directly related to the silver content.

It is believed that the reactions by which the hydrogen is absorbed are as follows:

$$2Ag. (resin) + H_2 \rightarrow 2H. (resin) + 2 Ag$$

$$2R.COO\ Ag + H_2 \rightarrow 2R.\ COOH + 2Ag$$

$$2(r.\ COO)_2\ Cu + H_2 \rightarrow 2R.\ COO\ Cu.$$

Different metals or types of carboxylic acid may be used in combination with the various water blocking compounds which might conceivably be used. Since the carboxylic acid salts are soluble in, or readily dispersed in, most commonly used water-blocking compounds, this facilitates the introduction of the salt into the cable structure. In addition, this enables larger amounts of the metal salt to be introduced into the compound with minimal effects on its properties. Many materials which have previously been used to absorb the hydrogen evolved in the cable do not dissolve in the usual water-blocking compounds. For example, zeolites are not soluble in petroleum jelly.

The hydrogen-absorptive material may be incorporated in the optical cable in other ways, not necessarily with a water-blocking compound. For example, it may be introduced into the polymer used to make the tubes which contain fibres in a bundle, or the grooved core of the cable which houses fibres. The organic anion gives the material a compatibility with such polymers. The material, with or without a water-blocking compound, could alternatively be introduced inside a separate tube within the cable structure.

In whatever manner the hydrogen-absorptive material is introduced in the optical fibre cable, the best results are achieved when it is in proximity to the optical fibres, but it will be appreciated that direct contact is not essential.

We claim:

1. An optical fibre cable including, within a surrounding cover, at least one optical fibre extending longitudinally, and a hydrogen-absorptive material in which the active part consists solely of a metallic cation and an organic anion.

2. A cable according to claim 1, further including a water-blocking compound in which the hydrogen-absorptive material is dissolved or dispersed.

3. An optical fibre cable including, within a surrounding cover, at least one optical fibre extending longitudinally, and a hydrogen-absorptive material in which the active part consists solely of a metallic cation and an organic anion, said hydrogen-absorptive material being a metal salt of a carboxylic acid.

4. A cable according to claim 3, in which the metal salt is a silver salt.

5. A cable according to claim 3, in which the metal salt is a salt of copper, iron, nickel or cobalt.

6. An optical fibre cable including, within a surrounding cover, at least one optical fibre extending longitudinally, and a hydrogen-absorptive material in which the active part consists solely of a metallic cation and an organic anion, said hydrogen-absorptive material being an ion exchange resin on which a metal is absorbed.

7. A cable according to claim 6, in which the metal is silver.

8. A cable according to claim 6, in which the metal is copper, iron, nickel or cobalt.

9. An optical fibre cable including, within a surrounding cover, at least one optical fibre extending longitudinally, and a hydrogen-absorptive material in which the active part consists solely of a metallic cation and an organic anion which is not obtained by the polymerization of conjugated diene-monomers.

10. An optical fibre cable including, within a surrounding cover, at least one optical fibre extending longitudinally, and a water-blocking compound comprised of petroleum jelly in or on which a hydrogen-absorptive material comprised of a silver-loaded cationic ion exchange resin is dissolved or absorbed, said jelly and resin forming a mixture of 100 parts jelly to 0.1 part resin.

11. An optical fibre cable including, within a surrounding cover, at least one optical fibre extending longitudinally, and a water-blocking compound comprised of petroleum jelly in or on which a hydrogen-absorptive material comprised of silver hexanoate is dissolved or absorbed, said jelly and silver hexanoate forming a mixture of 100 parts ajelly to 0.1 part silver hexanoate.

12. An optical fibre cable including, within a surrounding cover, at least one optical fibre extending longitudinally, and a water-blocking compound comprised of petroleum jelly in or on which a hydrogen-absorptive material comprised of cupric 2-ethyl-hexanoate forming a mixture of 100 parts jelly to 0.2 part cupric 2-ethyl-hexanoate.

13. An optical fibre cable including, within a surrounding cover, at least one optical fibre extemdomg logintidinally, and a water-blocking compound comprised of hydrocarbon oil in or on which a hydrogen-absorptive material comprised of silver polyacrylate is dissolved or absorbed, said oil and silver polyacrylate forming a mixture of 100 parts oil to 0.1 part silver polyacrylate.

14. An optical fibre cable including, within a surrounding cover, at least one optical fibre extending longitudinally, and a water-blocking compound comprised of hydrocarbon oil in or on which a hydrogen-absorptive material comprised of silver methacrylate is dissolved or absorbed, said oil and silver methacrylate forming a mixture of 100 parts oil to 0.1 part silver methacrylate.

* * * * *